(12) United States Patent
Taguchi et al.

(10) Patent No.: US 8,674,904 B2
(45) Date of Patent: Mar. 18, 2014

(54) COLOR DISPLAY DEVICE WITH A NON-RECTANGLE DISPLAY

(75) Inventors: Satoshi Taguchi, Tottori (JP); Susumu Iida, Tottori (JP); Koji Asada, Tottori (JP); Miyuki Ataka, Tottori (JP)

(73) Assignee: Japan Display West Inc., Chita-Gun, Aichi-Ken (JP)

( * ) Notice: Subject to any disclaimer, the term of this patent is extended or adjusted under 35 U.S.C. 154(b) by 514 days.

(21) Appl. No.: 12/330,881

(22) Filed: Dec. 9, 2008

(65) Prior Publication Data

US 2009/0195481 A1 Aug. 6, 2009

(30) Foreign Application Priority Data

Jan. 31, 2008 (JP) .................................. 2008-020327

(51) Int. Cl.
G09G 3/20 (2006.01)
(52) U.S. Cl.
USPC ............................................................. 345/55
(58) Field of Classification Search
USPC ................................ 349/80, 108, 146, 55, 109
See application file for complete search history.

(56) References Cited

U.S. PATENT DOCUMENTS

| | | | | |
|---|---|---|---|---|
| 5,247,284 A | * | 9/1993 | Fleming | ......................... 345/156 |
| 2003/0043157 A1 | * | 3/2003 | Miles | ............................. 345/540 |
| 2005/0225563 A1 | * | 10/2005 | Brown Elliott et al. | ....... 345/604 |
| 2005/0237450 A1 | * | 10/2005 | Hu et al. | ......................... 349/108 |
| 2006/0268203 A1 | * | 11/2006 | Kurahashi et al. | ............. 349/108 |
| 2008/0048934 A1 | * | 2/2008 | Yamamoto et al. | .............. 345/55 |
| 2008/0248240 A1 | * | 10/2008 | Shi | .................................. 428/141 |
| 2009/0115933 A1 | * | 5/2009 | Mimura | ........................... 349/59 |

FOREIGN PATENT DOCUMENTS

| | | | | |
|---|---|---|---|---|
| JP | 2006-276580 | 10/2006 | | |
| JP | A-2006-276360 | 10/2006 | | |
| JP | A-2007-072082 | 3/2007 | | |
| JP | 2007206230 A | * | 8/2007 | |
| JP | 2007-279719 | 10/2007 | | |
| JP | 2008-216356 | 9/2008 | | |
| WO | 2007-088656 | 8/2007 | | |
| WO | WO 2007132574 A1 | * | 11/2007 | ................ G09F 9/30 |

OTHER PUBLICATIONS

English machine translation of JP 2007/206230 A (Netsuo Okazaki, "Flat Panel Display Device", published Aug. 2007).*
Japanese Office Action issued Jun. 12, 2012, for corresponding Japanese Application No. 2008-020327.

* cited by examiner

*Primary Examiner* — Wayne Young
*Assistant Examiner* — Mark Fischer
(74) *Attorney, Agent, or Firm* — K&L Gates LLP

(57) ABSTRACT

A color display device includes a display area where a non-rectangular display range is determined. Pixels of which a display color is set to a mixed color formed by adjusting brightness of sub-pixels having a plurality of different single-colors are arranged within the display area. In addition, parts of the pixels subjected to non-coloring drive and display are arranged so as to extend to the contour of the display area.

4 Claims, 7 Drawing Sheets

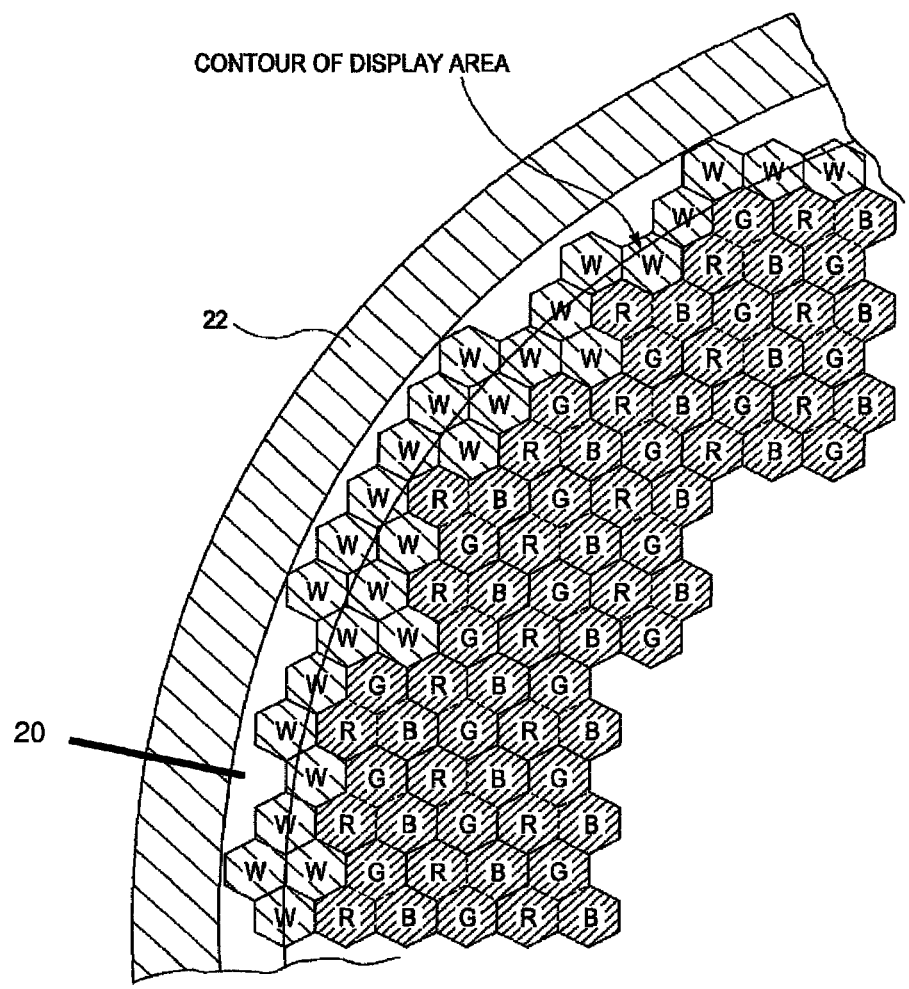

AREA $\frac{3\sqrt{3}}{2} \simeq 2.598$

COLOR DISPLAY DEVICE WITH A NON-RECTANGLE DISPLAY

BACKGROUND

1. Technical Field

The present invention relates to a color display device having a non-rectangular display area.

2. Related Art

Liquid crystal display panels and organic EL displays are widely used in many electronic apparatuses, since the liquid crystal display panels and the organic EL displays have features of lightness, thinness, and low power consumption. In general, a display area is rectangular and one square pixel has three red, green, and blue (RGB) rectangular sub-pixels.

With a tendency to diversifying the designs of in-vehicle instruments, watches, accessories, or the like, non-rectangular panels of which corners of a rectangular display area are cut (see JP-A-2007-72082) or the display area is circular or elliptical (see JP-A-2006-276360) were devised.

However, a problem occurs in that parts of pixels extending in a display area for color mixing control due to the rectangular shape (see JP-A-2006-276360) of the pixels do not appropriately exhibit colors at color display time and a perpendicular stair-shaped backlash occurs in the vicinity of an outer circumference, as shown in FIG. 7.

SUMMARY

According to an aspect of the invention, there is provided a color display device including a display area where a non-rectangular display range is determined. Pixels of which a display color is set to a mixed color formed by adjusting brightness of sub-pixels having a plurality of different single-colors are arranged within the display area. In addition, parts of the pixels subjected to non-coloring drive and display are arranged so as to extend to the contour of the display area.

With such a configuration, the entire display area can be driven and displayed even when the vicinity of the outer circumference is achromatic. Accordingly, it is possible to allow the perpendicular stair-shaped backlash to be not viewed in the vicinity of the outer circumference.

In the color display device, the pixels subjected to the non-coloring drive and display may each include an achromatic color filter.

In the color display device, the pixels subjected to the non-coloring drive and display may each have no color filter.

According to another aspect of the invention, there is provided a color display device including a display area where a non-rectangular display range is determined. Pixels of which a display color is set to a mixed color formed by adjusting brightness of sub-pixels having plural different single-colors are arranged within the display area. In addition, parts of the sub-pixels subjected to non-coloring drive and display are arranged so as to extend to the contour of the display area.

In this way, by performing the achromatic drive and display on the sub-pixels smaller than the pixels, it is possible to allow the perpendicular stair-shaped backlash to be not viewed in the vicinity of the outer circumference.

In the color display device, the brightness of the sub-pixels of the pixels subjected to the non-coloring drive and display may be made substantially equal to that of adjacent chromatic sub-pixels.

In this way, by making the brightness of the sub-pixels of the pixels equal to the brightness of adjacent chromatic sub-pixels, it is possible to allow the perpendicular stair-shaped backlash to be not viewed in the vicinity of the outer circumference.

BRIEF DESCRIPTION OF THE DRAWINGS

The invention will be described with reference to the accompanying drawings, wherein like numbers reference like elements.

FIG. 5 is a diagram illustrating the arrangement of sub-pixels according to a third embodiment.

DESCRIPTION OF EXEMPLARY EMBODIMENTS

Hereinafter, preferred embodiments of the invention will be described with reference to the drawings. In the preferred embodiments described below, it should be understood that a display panel is an exemplary realizing the technical idea of the invention and is not to be considered as limiting. Other embodiments without departing from the claims are also put into practice.

First Embodiment

Figure 1:
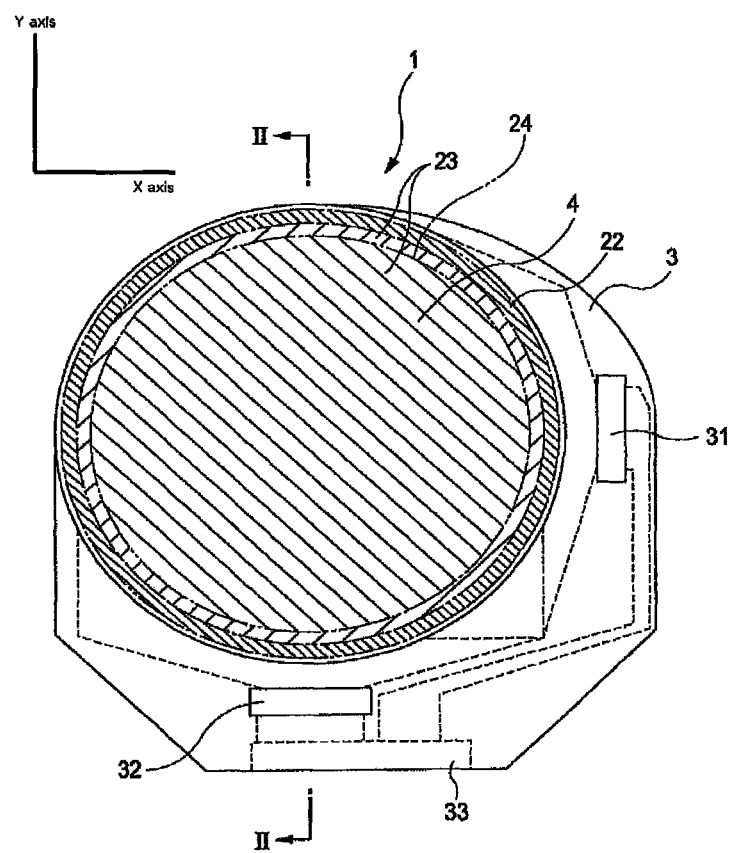
FIG. 1 is a plan view illustrating major constituent elements according to a first embodiment of the invention.
Figure 2:
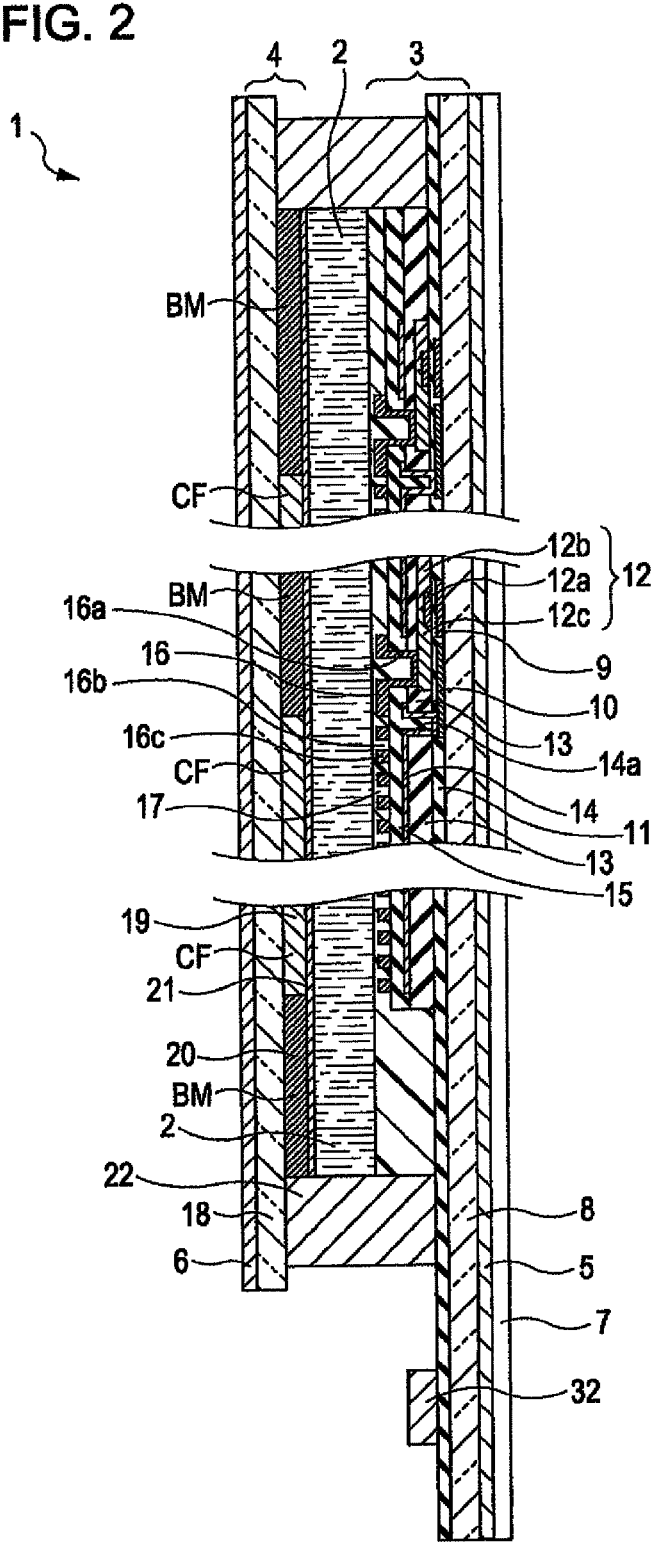
FIG. 2 is a sectional view taken along line II-II of FIG. 1 according to the first embodiment.

FIG. 1 is a plan view illustrating major constituent elements according to a first embodiment of the invention. FIG. 2 is a sectional view taken along the line II-II of FIG. 1. A display panel according to the first embodiment is an in-plane switching mode full-color display panel.

As shown in FIGS. 1 and 2, a display panel 1 includes a liquid crystal layer 2 interposed between a TFT array substrate 3 and a color filter substrate 4. A first polarizing plate 5 is formed on the rear surface of the TFT array substrate 3 and a second polarizing plate 6 is formed on the front surface of the color filter substrate 4. A backlight unit 7 emitting light is disposed on a side of the rear surface of the TFT array substrate 3.

First, the configuration of sub-pixels of the TFT array substrate 3 will be described. In the TFT array substrate 3, a substrate main body 8 formed of glass, quartz, plastic, or the like serves as a base substrate. In each of the sub-pixels of the TFT array substrate 3, a scanning line 9, a common electrode line 10, a gate insulation film 11 covering the scanning line 9 and the common electrode line 10 are formed close to the liquid crystal layer 2 of the substrate main body 8. An amorphous silicon semiconductor layer 12a is formed on the gate insulation film 11. A source electrode 12b and a drain electrode 12c are formed to cover a part of the semiconductor layer 12a. The semiconductor layer 12a, the source electrode 12b, and the drain electrode 12c form a TFT 12. The semiconductor 12a is disposed opposite the scanning line 9 with the gate insulation film 11 interposed therebetween and the scanning line 9 forms a gate electrode of the TFT 12 in the opposite area. The source electrode 12b is branched from a data line (not shown). The data lines extend in Y-axis direction of FIG. 1 and the scanning lines 9 extend in an X-axis direction thereof.

A first interlayer insulation film 13 is formed to cover the semiconductor layer 12a, the source electrode 12b, and the drain electrode 12c. A common electrode 14 formed of a transparent conductive material such as ITO is formed to cover the first interlayer insulation film 13. The common electrode 14 is electrically connected to the common electrode line 10 via a common contact hole 14a perforated through the first interlayer insulation film 13 and the gate insulation film 11.

A second interlayer insulation film 15 formed of silicon oxide or the like is disposed to cover the common electrode 14. A pixel electrode 16 formed of a transparent conductive material such as ITO is formed on the side surface of the liquid crystal layer of the second interlayer insulation film 15. A first alignment film 17 formed of polyimide is formed to cover the pixel electrode 16 and the second interlayer film 15.

A pixel contact hole 16a perforated through the first interlayer insulation film 13 and the second interlayer insulation film 15 and reaching the drain electrode 12c is formed. The pixel electrode 16 and the drain electrode 12c are electrically connected to each other with the pixel contact hole 16a interposed therebetween.

The pixel electrode 16 includes a belt-shaped electrode 16c formed by vacant portions (slits) 16b of a plurality of lines substantially extending in an x-axis direction of FIG. 1. Both electrodes of the common electrode 14 and the pixel electrode 16 which interpose the second interlayer insulation film 15 serve as a dielectric film to form storage capacitance.

Next, the color filter substrate 4 of the sub-pixels will be described. In the color filter substrate 4, a substrate main body 18 formed of glass, quartz, plastic, or the like serves as a base substrate. In the substrate main body 18, a CF (color filter) layer 19 passing through other color light (R, G, B, or colorless) and a BM (black matrix) 20 formed of a light-shielding material are disposed in each sub-pixel. A second alignment film 21 formed of polyimide is formed by covering the BM 20 with the CF layer 19.

Since a transmission axis of the polarizing plate 5 in the TFT array substrate 3 is perpendicular to a transmission axis of the polarizing plate 6 in the color filter substrate 4, so that the transmission axis of the polarizing plate 6 is parallel to the X-axis of FIG. 1. Moreover, a rubbing direction of the first alignment film 17 is parallel to the transmission axis of the polarizing plate 6. The rubbing direction of the first polarizing film 17 intersects with a main direction of an electric field generated between the pixel electrode 16 and the common electrode 14. Liquid crystal aligned parallel to the rubbing direction in an initial state is rotated in a main direction of the electric field and aligned, when voltage is applied between the pixel electrode 16 and the common electrode 14. Gray scale display of the sub-pixels is achieved on the basis of a difference between the initial alignment state and the alignment state with application of voltage. In this way, it is possible to drive and display the sub-pixels.

The liquid crystal layer 2 is sealed within a seal area formed by a seal member 22 disposed between the TFT array substrate 3 and the color filter substrate 4. Even though not shown, the seal member 22 includes an inlet port for injecting liquid crystal and a sealing portion for sealing the inlet port.

As shown in FIG. 1, the color filter substrate 4 has a circular shape. A gate driver 31 is disposed in a right extension portion of the TFT array substrate 3 and a source driver 32 is disposed in a lower extension portion thereof. An output side of the gate driver 31 is connected to the scanning lines 9 extending in the X-axis direction to drive the sub-pixels in a vertical direction and an output side of the source driver 32 is connected to the data lines extending in the Y-axis direction to drive the sub-pixels in a horizontal direction. The gate driver 31 and the source driver 32 are connected to an output terminal 33 of the TFT array substrate 3. A circular display area 24 (a shaded area in a downward right direction of FIG. 1) is present in a circular hermetic area 23 (a shaded area in an upward right direction of FIG. 1). In a region where the display area 24 is not present in the hermetic area 23, there is no CF layer and light is shield by the BM. An opening of a light-shielding member is the display area 24.

Figure 3:
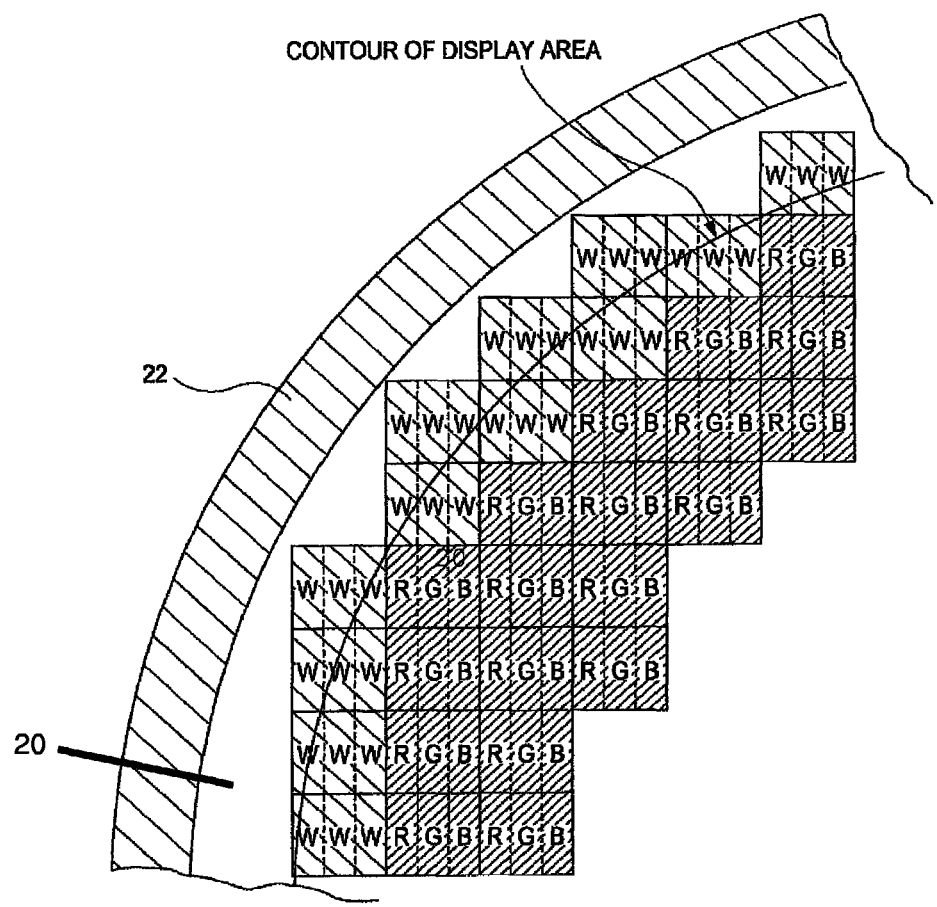
FIG. 3 is a diagram illustrating the arrangement of pixels according to the first embodiment.
Figure 7:
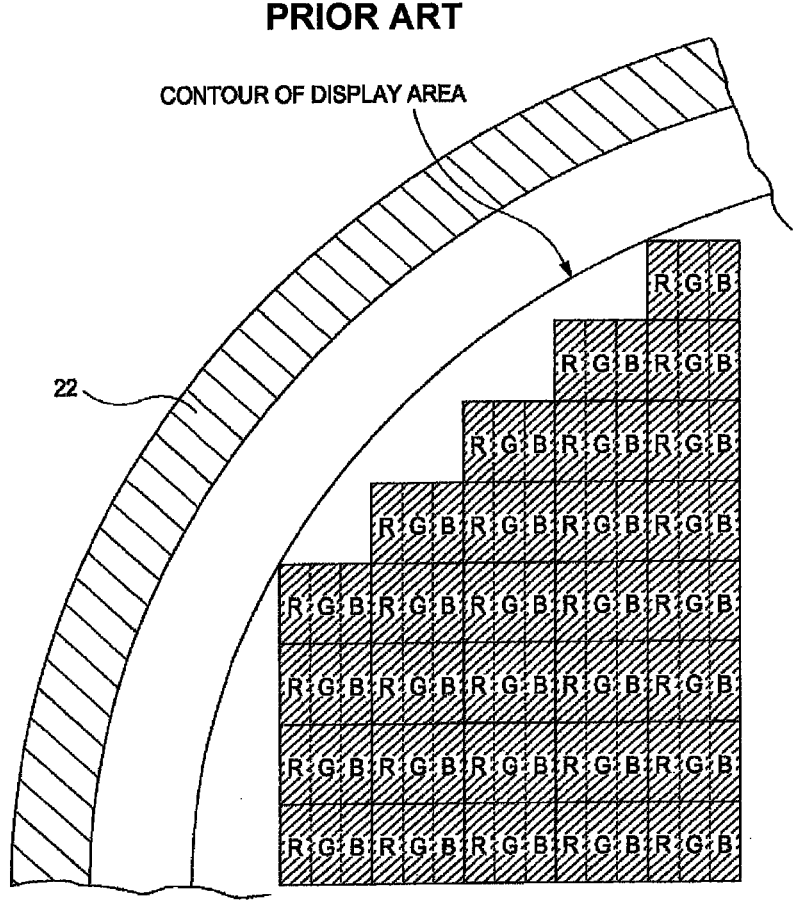
FIG. 7 is diagram illustrating the arrangement of pixels according to a know example.

FIG. 3 is a diagram illustrating the shape of the sub-pixels and the shape of the pixels according to the first embodiment. Each of three RGB sub-pixels has a quadrate shape. Since a color of one pixel is expressed by gray scale combination of the three RGB sub-pixels, only the pixels containing all the three RGB sub-pixels in the display area 24 can make a color display. Accordingly, like a known example shown in FIG. 7, parts of the pixels extending in the contour of the display area 24 are non-display regions. In this case, since a difference between the brightness of non-display regions and the brightness of the pixels to be displayed is increased, backlash may be viewed in the circumference of the display area 24. Accordingly, in the first embodiment, as shown in FIG. 3, the sub-pixels are driven and displayed with the same brightness as that of the adjacent sub-pixels or the adjacent pixels by allowing the color filters of the pixels of which the parts extending in the contour of the display area 24 to be achromatic (W in FIG. 3). To allow the color filters to be achromatic means that the color filter is configured as an achromatic layer and includes a colorless transparent layer and a transparent gray layer. Moreover, a case where there is no color filter is also included. Therefore, the circumference of the display area 24 is displayed with a color with low chromaticity of the adjacent pixels thanks to mixture with the chromatic adjacent sub-pixels. As a result, the backlash is not viewed, compared to the known example in which the drive and display operation is not performed. In this way, the display area 24, which is a visible range of a user, is an area including the RGB sub-pixels and the achromatic sub-pixels. Moreover, the invention is applicable to an organic EL display. In this case, non-coloring drive and display is performed by replacing the above color filter by an achromatic color filter of a liquid crystal panel and using an achromatic luminescence element.

Second Embodiment

Figure 4:
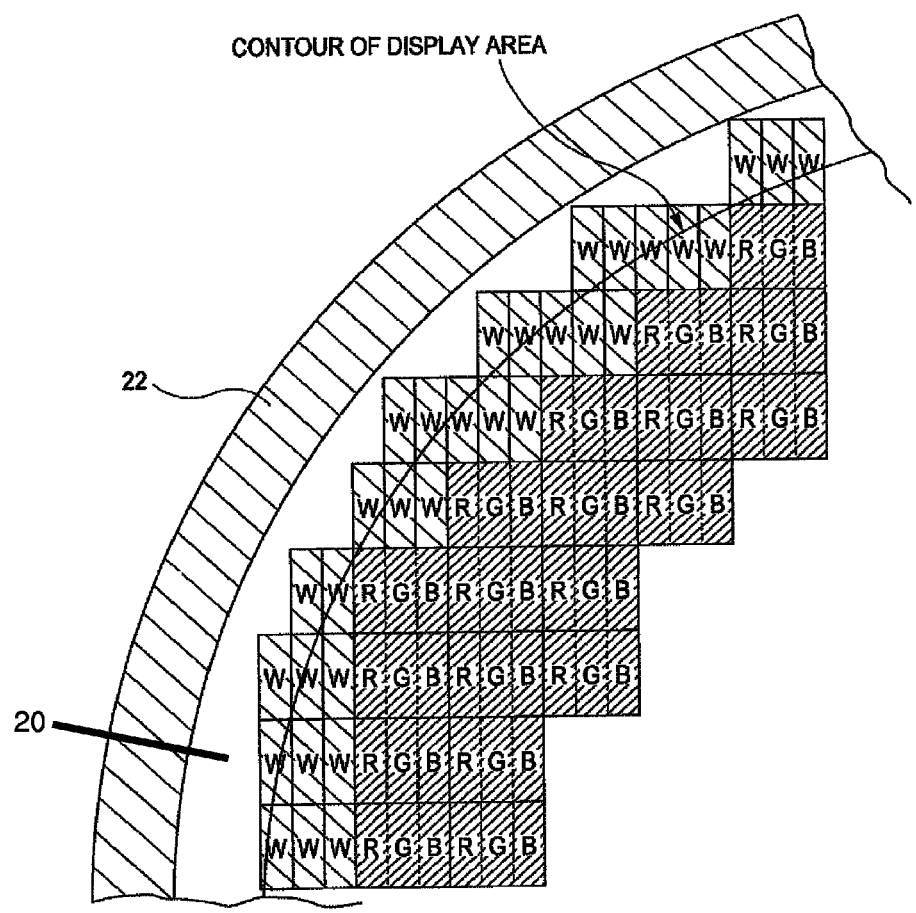
FIG. 4 is a diagram illustrating the arrangement of sub-pixels according to a second embodiment.

In order to perform the non-coloring drive and display on the pixels of which the parts extending in the contour of the display area 24, the hermetic area 23 sealed by the seal member 22 has to include achromatic pixels. Therefore, the size of the display panel 1 is increased. A second embodiment shows an example in which the hermetic area 23 sealed by the seal member 22 is made small. FIG. 4 is a diagram illustrating sub-pixels according to the second embodiment. In the first embodiment, the parts of the pixels extend in the contour of the display area 24. In the second embodiment, as shown in FIG. 4, the sub-pixels are subjected to the non-coloring drive and display. Since the size of the diagonal line of the sub-pixel is smaller than that of the diagonal line of the pixel, it is possible to reduce the size of the hermetic area 23 according to the second embodiment.

Third Embodiment

FIG. 5 is a diagram illustrating sub-pixels according to a third embodiment. The sub-pixel according to the third embodiment is regular hexagonal. The sides of the regular hexagonal sub-pixels are adjacent to each other, so that the centers of three sub-pixels constituting one pixel form a regular triangle. Moreover, since the angle of the pixel according to the third embodiment is 120°, it is possible to reduce the stair-shaped backlash, compared to the pixels having 90° according to the first and second embodiments.

Figure 6A:
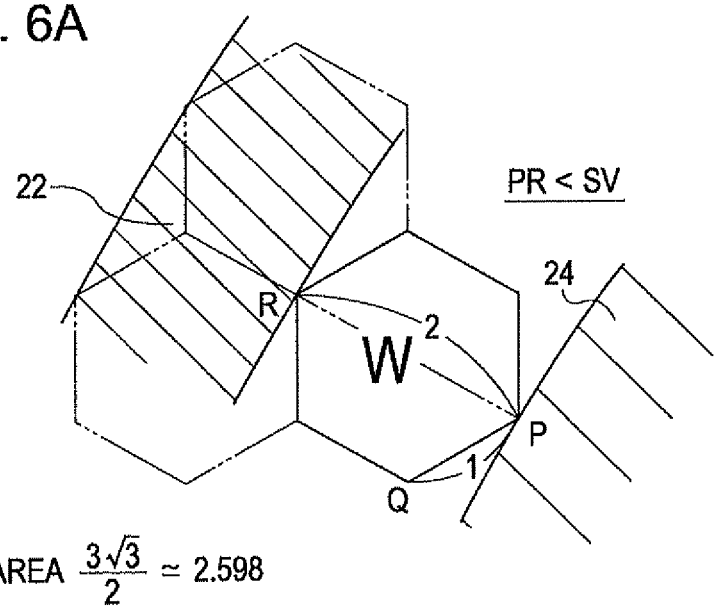
FIGS. 6A and 6B is a diagram illustrating the sizes of diagonal lines of the sub-pixel according to the third embodiment.
Figure 6B:
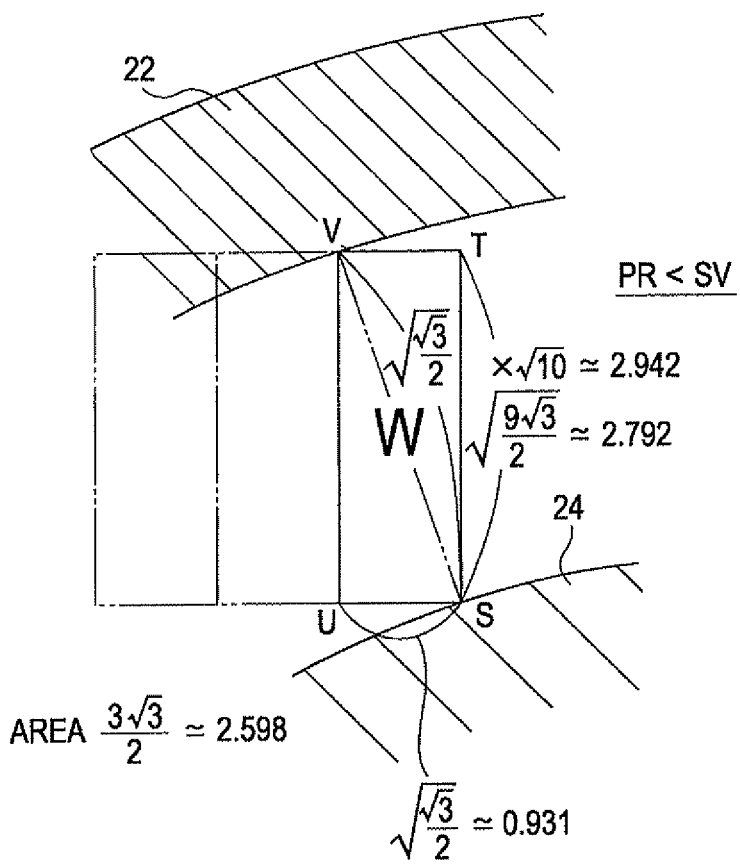

As shown in FIGS. 6A and 6B, on the assumption that the size of one side of the regular hexagonal sub-pixel according to the third embodiment is 1, the longest diagonal line of the sub-pixel is 2 (see FIG. 6A). Accordingly, the size of one diagonal line of the pixel according to the second embodiment which has the same area as that of the sub-pixel according to the third embodiment is about 2.942 (see FIG. 6B). Since the sub-pixel having a shorter diagonal line can reduce a gap between the display area 24 and the seal member 22, it is possible to reduce the size of the hermetic area 23 in the sub-pixels having the shorter diagonal line according to the third embodiments compared to the sub-pixels having the rectangular shape according to the second embodiment.

The regular hexagonal shape in the invention is not limited to a perfectly regular hexagonal shape, but may be a substantially regular hexagonal shape as long as an operational advantage obtained from the substantially regular hexagonal shape is provided. For example, the hexagonal shape of which corners are round or the hexagonal shape of which side lengths or angles are slightly different from each other may be used.

The non-rectangular shape described above is circular, but the invention is not limited to the circular shape. For example, an elliptical shape, a polygonal shape obtained by cutting angles of a rectangle, a heart shape, or the like may be used.

The display area described in the embodiments is a visible area formed by the BM, but may be a display area in a specification. For example, a cover having a transparent window having the same size as that of the display area in the specification may be disposed in front of a display panel.

Moreover, the invention is not limited to the liquid display panel described in the embodiments, but may be applied to an organic EL display.

The entire disclosure of Japanese Patent Application No. 2008-20327, filed Jan. 31, 2008 is expressly incorporated by reference herein.

What is claimed is:

1. A color display device including a display area where a non-rectangular display range is determined, the color display device comprising:
    a plurality of display pixels each including a plurality of sub-pixels, a display color of the respective display pixels being set to a mixed color formed by adjusting a brightness of the sub-pixels of the display pixels, the sub-pixels of the display pixels having a plurality of different single light-emitting colors being arranged within the display area; and
    a plurality of contour pixels each including a plurality of sub-pixels, each of said sub-pixels of the contour pixels being subjected to non-coloring drive and display, the contour pixels being arranged along the contour of an outer perimeter of the display area, and at least portions of a plurality of the sub-pixels of the contour pixels being arranged outside the outer perimeter of the display area without being shielded by a light-shielding member.

2. The color display device according to claim 1, wherein the contour pixels subjected to the non-coloring drive and display each include an achromatic color filter.

3. The color display device according to claim 1, wherein the contour pixels subjected to the non-coloring drive and display each have no color filter.

4. The color display device according to claim 1, wherein the brightness of the sub-pixels of the contour pixels subjected to the non-coloring drive and display is made substantially equal to that of adjacent chromatic sub-pixels of the display pixels.

* * * * *